United States Patent
Hald et al.

(10) Patent No.: US 11,732,913 B2
(45) Date of Patent: Aug. 22, 2023

(54) SYSTEM AND METHOD FOR CONTROLLING INTERNAL TEMPERATURE OF MEDIA LIBRARY

(71) Applicant: Quantum Corporation, San Jose, CA (US)

(72) Inventors: Bruno Hald, Parker, CO (US); Scott M. Rockwell, Aurora, CO (US); David Tindall, III, Parker, CO (US)

(73) Assignee: QUANTUM CORPORATION, San Jose, CA (US)

( * ) Notice: Subject to any disclaimer, the term of this patent is extended or adjusted under 35 U.S.C. 154(b) by 341 days.

(21) Appl. No.: 16/869,460

(22) Filed: May 7, 2020

(65) Prior Publication Data

US 2021/0348781 A1 Nov. 11, 2021

(51) Int. Cl.
  *F24F 7/007* (2006.01)
  *G11B 33/14* (2006.01)
  *G01K 13/02* (2021.01)
  *G05B 15/02* (2006.01)
  *G01K 13/024* (2021.01)

(52) U.S. Cl.
  CPC .............. *F24F 7/007* (2013.01); *G01K 13/02* (2013.01); *G05B 15/02* (2013.01); *G11B 33/144* (2013.01); *G01K 13/024* (2021.01)

(58) Field of Classification Search
  None
  See application file for complete search history.

(56) References Cited

U.S. PATENT DOCUMENTS

| | | | | |
|---|---|---|---|---|
| 7,180,701 B2 * | 2/2007 | Armagost | .......... | G11B 15/6835 |
| 8,374,731 B1 * | 2/2013 | Sullivan | ............ | H05K 7/20836 |
| | | | | 700/12 |
| 11,500,545 B2 | 11/2022 | Nave et al. | | |
| 2004/0025515 A1 * | 2/2004 | Evans | ..................... | H01L 35/00 |
| 2009/0262455 A1 * | 10/2009 | Merrow | ............... | G11B 33/144 |
| | | | | 360/97.13 |
| 2014/0240913 A1 * | 8/2014 | Vyshetsky | ............... | G06F 1/206 |
| | | | | 361/679.31 |

(Continued)

FOREIGN PATENT DOCUMENTS

| | | | | |
|---|---|---|---|---|
| WO | WO-2011066563 A2 * | 6/2011 | .............. | F24F 7/007 |
| WO | WO-2016031197 A1 * | 3/2016 | ............. | G05B 15/02 |

*Primary Examiner* — Matthew G Marini
(74) *Attorney, Agent, or Firm* — Roeder & Broder LLP; James P. Broder

(57) ABSTRACT

A media library includes a library housing, a heat-producing device, one or more storage media and an air mover assembly. The library housing can include a library interior where the library interior can include a first wall and a second wall positioned opposite the first wall. The heat-producing device can be positioned near the first wall of the library interior. The one or more storage media can be positioned in the library interior between the heat-producing device and the second wall. The air mover assembly can be is configured to move air into the library interior through the first wall and out of the library interior through the second wall. The heat-producing device can include one or more of a media drive, a power supply and a controller. The air mover assembly can move air through the heat-producing device before the air moves through the one or more storage media.

20 Claims, 5 Drawing Sheets

(56) References Cited

U.S. PATENT DOCUMENTS

2015/0134123 A1* 5/2015 Obinelo ................... F24F 11/30
 700/277
2018/0095508 A1* 4/2018 Yi ....................... H05K 7/20163
2018/0267581 A1* 9/2018 Miranda Gavillan .......................
 H05K 7/20709

* cited by examiner

SYSTEM AND METHOD FOR CONTROLLING INTERNAL TEMPERATURE OF MEDIA LIBRARY

BACKGROUND

Automated media libraries (hereinafter sometimes referred to simply as "media library") are commonly utilized for purposes of writing data to and reading data from storage media. In particular, the media libraries typically include a media storage retrieval assembly (or "media retriever") that selectively retrieves and moves storage media as desired between storage slots and media drives within the media library. Media libraries are substantially enclosed and require constant air flow through the media library to cool heat-producing devices such as the media drives, the power supplies, robotics, and the controllers as well as to maintain the storage media below a maximum allowed temperature. In traditional data centers, media libraries are positioned between a "hot aisle" and a "cold aisle", where the front of the media library is adjacent to the cold aisle and the rear of the media library is adjacent to the hot aisle. Traditional media libraries have some or all of the heat-generating components positioned at the rear of the media library while some or all of the storage media are positioned in the front of the media library. Traditional air flow brings in the cold air from cold aisle and exhausts it through the rear of the media library into the hot aisle. This allows the incoming cold air to maintain the storage media at or below the maximum allowed temperature and then cool the heat-generating components before the air exits the rear of the media library.

For example, FIG. 1A is a simplified schematic view illustration of a prior art media library 10P. In FIG. 1A, the media library 10P is positioned between a cold aisle 58P and a hot aisle 60P. A top cover (not shown) has been omitted for clarity so that the interior of the media library 10P is visible. The media library 10P is capable of storing a plurality of storage media 20P such as tape cartridges.

As illustrated in FIG. 1A, the media library 10P includes: (i) a library housing 14P that defines a library interior 16P, (ii) a plurality of storage slots 18P that is each configured to receive and selectively retain (and store) a storage medium 20P, e.g., a tape cartridge, (iii) a rack assembly 22P including one or more racks 23P, (iv) a storage media retrieval assembly 24P (also sometimes referred to herein as a "media retriever"), (v) one or more media drives 26P, e.g., tape drives, (vi) a power supply 28P, (vii) a controller 30P, (viii) a graphical user interface 35P (sometimes referred to herein as a "GUI"), and (ix) an air intake 44P.

The library housing 14P is configured to retain the various components of the media library 10P. The library housing 14P has a first wall 48P and a second wall 50P that is positioned opposite the first wall 48P. As shown in FIG. 1A, the plurality of storage slots 18P, the rack(s) 23P of the rack assembly 22P, the media retriever 24P, the one or more media drives 26P, the power supply 28P, and the controller 30P are all received and retained within the library interior 16P.

In FIG. 1A, the plurality of storage slots 18P can be positioned within the library housing 14P, with the storage slots 18P being configured to receive and retain (and store) the storage media 20P. More particularly, each of the storage slots 18P is configured to receive and retain a single storage medium 20P.

The rack assembly 22P and/or the one or more racks 23P are configured to support the media retriever 24P during use of the media retriever 24P within the media library 10P. Each rack 23P is oriented in a generally vertical direction and extends to a height that is sufficient to enable the media retriever 24P to retrieve a storage media 20P from any of the plurality of storage slots 18P.

The media retriever 24P retrieves and moves the storage media 20P between the storage slots 18P and the media drives 26P. The media drive 26P is configured for reading and/or writing data with respect to the storage media 20P.

The power supply 28P provides electrical power to the media drives 26P, the media retriever 24P, and the controller 30P. The power supply 28P is interfaced with these components. The power supply 28P is positioned in the library interior 16P near the second wall 50P so the waste heat generated by the power supply 28P is exhausted out of the library interior 16P into the hot aisle 60P without affecting the storage media 20P.

The controller 30P provides the desired and necessary control for general functionality of the media library 10P. The controller 30P is positioned in the library interior 16P near the second wall 50P so the waste heat generated by the controller 30P is exhausted out of the library interior 16P into the hot aisle 60P without affecting the storage media 20P.

Further, as shown, the media library 10P includes the graphical user interface ("GUI") 35P that allows the user to interact and/or transmit requests or commands to the media library 10P such as, for example, move a specific storage medium 20P to a specific media drive 26P or to report conditions internal to the media library 10P.

As with most electrical devices, waste heat is produced in the media library 10P during operation. Heat-producing devices, such as the media drive 26P, the power supply 28P, and the controller 30P, as non-exclusive examples, produce waste heat to perform their respective operations. The storage media 20P are temperature-sensitive and have a maximum allowed temperature above which damage to the storage media 20P can occur. As a result, the waste heat from the heat-producing devices must be removed from the library interior 16P such that the temperature of the storage media 20P remains below the maximum allowed temperature. The heat-producing devices and/or the media library 10P have an internal fan (not shown) that removes the waste heat by moving air from the cold aisle 58P into the from the library interior 16P through the air intake 44P, across the storage media 20P, through the heat-producing devices, and out of the media library 10P into the hot aisle 60P. The library interior 16P has an interior air flow that moves in direction 36P from the first wall 48P to the second wall 50P.

Air flow through the media drive 26P is into the media drive 26P from library interior 16P then out of the media drive 26P into hot aisle 60P. A reversal of air flow through the media drives 26P would result in the media library 10P receiving hot air from the hot aisle 60P, which would be made even hotter as it passes through the media drives 26P before passing into the library interior 16P and over the storage media 20P as it exits the media library 10P. This would result in the maximum allowed temperature for the storage media 20P to be exceeded and possibly resulting in damage to the storage media 20P.

Prior art FIG. 1B is a simplified side view illustration of the media library 10P shown in FIG. 1A having air flow in a standard direction. The media drives 26P, the power supply 28P, and the controller 30P are positioned on support assembly 32P near the second wall 50P.

As shown, the standard direction for the air flow is where the inlet air flow 34P enters the library interior 16P from the cold aisle 58P through the air intake 44P. After the inlet air flow 34P enters the library interior 16P and becomes the interior air flow 64P, the interior air flow 64P moves across the storage slots 18P, the storage media 20P, and the media retriever 24P. The interior air flow 64P then moves through the media drives 26P, the power supply 28P, and the controller 30P where it exits the media library 10P through those heat-producing devices into the hot aisle 60P as the exhaust air flow 38P.

Access to the prior art media library 10P is typically from the hot aisle 60P. However, as technologies and data center designs have changed, including heightened security requirements, data centers have adapted their operations to meet growing demand while minimizing power consumption. In support of that, data centers are running cooling fans at lower speeds and maintaining higher overall temperatures resulting in temperatures in the hot aisle 60P approaching or exceeding the maximum temperatures allowed for data center workers.

SUMMARY

The present invention is directed toward a media library. In various embodiments, the media library includes a library housing, a heat-producing device, one or more storage media, and an air mover assembly. The library housing can define a library interior where the library housing can include a first wall and a second wall positioned opposite the first wall. The heat-producing device can be positioned near the first wall of the library interior. The one or more storage media can be positioned in the library interior between the heat-producing device and the second wall. The air mover assembly can be coupled to the library housing where the air mover assembly can be configured to move air into the library interior through the first wall and out of the library interior through the second wall.

In some embodiments, the air mover assembly can include a first air mover that is configured to move the air into the library interior through the first wall. In further embodiments, the first air mover can move air out of the library interior through the second wall. In other embodiments, the air mover assembly can include a second air mover that cooperates with the first air mover to move air through the library interior. In further embodiments, the second air mover is spaced apart from the first air mover.

In certain embodiments, the media library can include an exhaust vent positioned on the second wall where the air mover assembly can move air out of the library interior via the exhaust vent.

In various embodiments, at least a portion of the air mover assembly can be coupled to the second wall.

In some embodiments, the air mover assembly can move air through the heat-producing device before the air moves through the one or more storage media.

In certain embodiments, the heat-producing device can be positioned substantially between the first wall and the one or more storage media.

In various embodiments, the heat-producing device can include at least one of a media drive, a power supply and a controller.

In some embodiments, the media library can include a controller that is configured to control the air mover assembly to adjust the air movement through the library housing.

In certain embodiments, the media library can include a controller that is configured to control the air mover assembly to adjust air movement through the library housing based at least in part upon a temperature reading within the library interior.

In various embodiments, the media library can include a controller that is configured to control the air mover assembly to adjust air movement through the library housing based at least in part on a signal from the heat producing device where the signal can indicate a workload of the heat-producing device.

In some embodiments, the one or more storage media can have a maximum allowed temperature where the media library can be configured to maintain the one or more storage media below the maximum allowed temperature.

The present invention is also directed toward a method of managing an interior temperature of a media library. In some embodiments, the method includes the steps of positioning a heat-producing device in the library interior near a first wall, positioning one or more storage media in the library interior between the heat-producing device and a second wall where the second wall can be opposite the first wall, and actuating an air mover assembly where the air mover assembly can be configured to move air into the library interior through the first wall and out of the library interior through the second wall.

In some embodiments, the method can include the steps of (i) sensing an internal temperature of the library interior, and (ii) adjusting the air mover assembly based in part on the internal temperature.

In certain embodiments, the method can include the steps of (i) sensing an external temperature of the media library, and (ii) adjusting the air mover assembly based in part on the external temperature.

In various embodiments, the step of positioning the heat-producing device can include positioning the heat-producing device substantially between the first wall and the one or more storage media.

In some embodiments, the air mover assembly can include a first air mover and a second air mover that cooperate to move air first across the heat-producing device and then across the one or more storage media.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Embodiments of the present invention are described herein in the context of a system and method for maintaining and controlling the internal temperature of a media library.

Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same or similar reference indicators will be used throughout the drawings and the following detailed description to refer to the same or like parts.

In the interest of clarity, not all of the routine features of the implementations described herein are shown and described. It will, of course, be appreciated that in the development of any such actual implementations, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 2A:
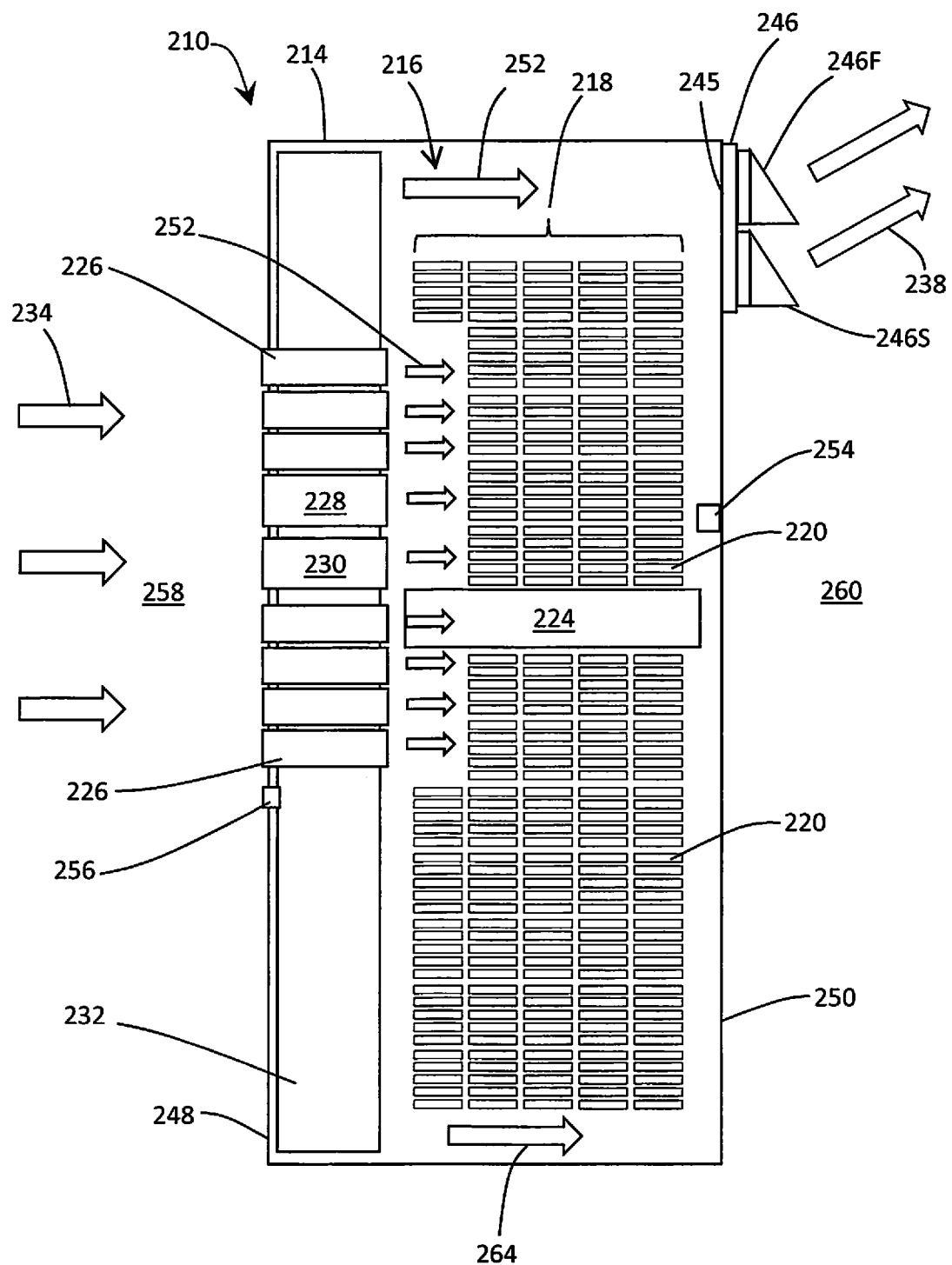
FIG. 2A is a simplified side view illustration of an embodiment of a media library having features of the present invention.

FIG. 2A is a simplified side view illustration of an embodiment of a media library 210 having features of the present invention. As shown in FIG. 2, the media library 210 comprises a library housing 214 that defines a library interior 216. The design of the media library 210 can vary. In some embodiments, the library housing 214 includes a first wall 248 and a second wall 250 positioned opposite the first wall 248, a support assembly 232, one or more media drives 226, a power supply 228, a controller 230, a media retriever 224, a plurality of storage slots 218, a plurality of storage media 220, and an air mover assembly 246. In FIG. 2A, a portion of the storage slots 218 have been removed for clarity, however this is not to be considered limiting. Other embodiments of the media library 210 can include one or more interior temperature sensors 254 and/or one or more inlet temperature sensors 256. It is appreciated that some embodiments of the media library 210 can have fewer or more components than those specifically shown and described herein.

The media drives 226, the power supply 228, and the controller 230 are referred to herein as "heat-producing devices". The media library 210 can be positioned between a cold aisle 258 that sources cold air for the media library 210 and a hot aisle 260 that receives hot air from the media library 210. As used herein, the term "hot air" is air whose temperature is above that of the cold air from the cold aisle 258.

The support assembly 232 is positioned near the first wall. The design of the support assembly 232 can vary. In some embodiments, the support assembly 232 is configured to receive the media drives 226, the power supply 228, and the controller 230, however, other components of the media library 210 not described herein can also be received by the support assembly 232.

Figure 1A:
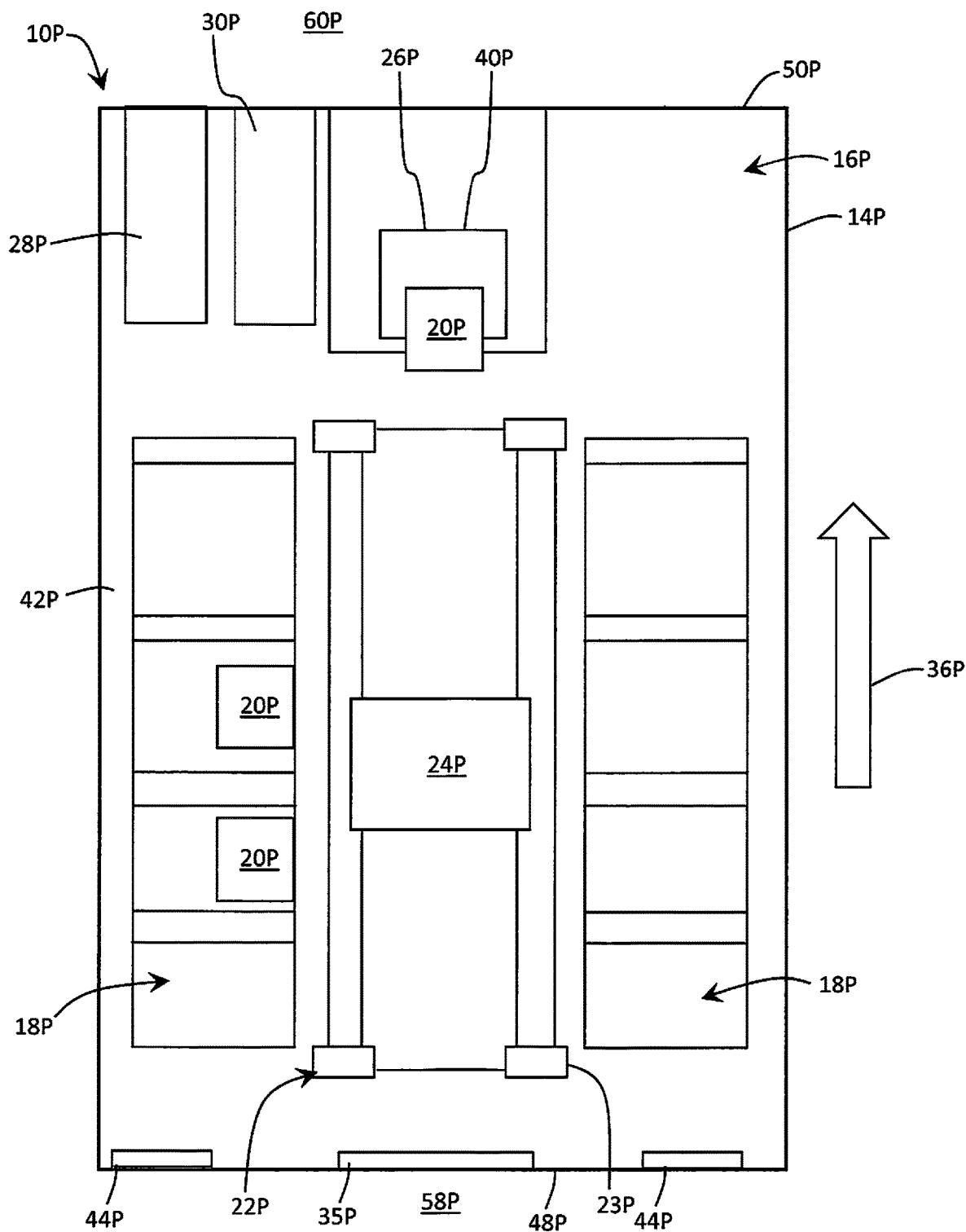
FIG. 1A is a simplified top view illustration of an embodiment of a prior art media library.
Figure 1B:
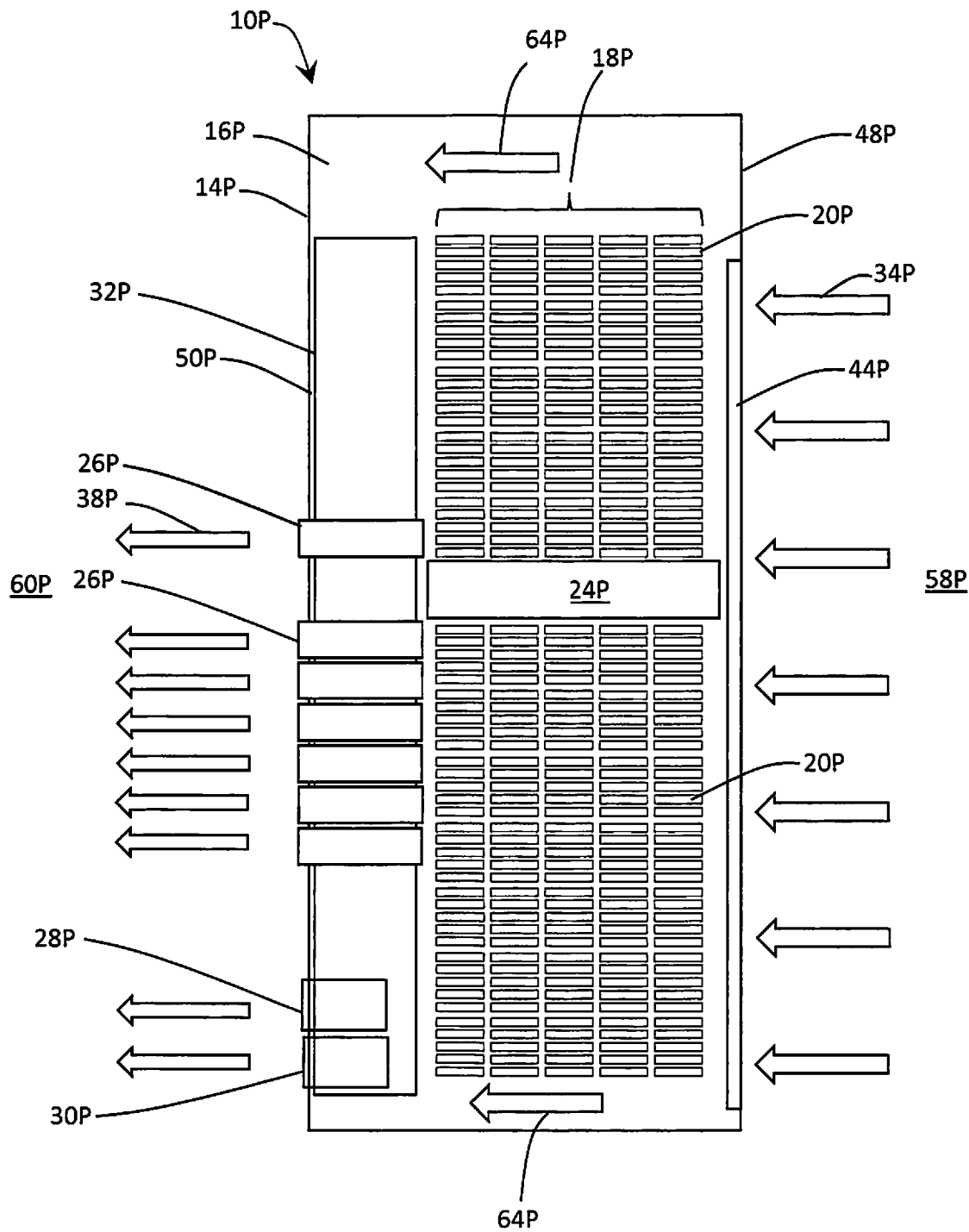
FIG. 1B is a simplified side view illustration of the embodiment of the prior art media library in FIG. 1A showing the air flow through the prior art media library.

The design and operation of the heat-producing devices in FIG. 2A, i.e. the media drives 226, the power supply 228, and the controller 230, can operate in a substantially similar or identical manner to the media drives 26P, the power supply 28P, and the controller 30P illustrated and/or described relative to FIGS. 1A and 1B except that air flow through them is in a different, if not opposite, direction. In FIG. 2A, the air flow path through the media drive 226 is into the media drive 226 from the cold aisle 258 then out of the media drive 226 into the library interior 216. Because of the airflow designs provided herein, the temperature of the storage media 220 is properly maintained below the maximum allowed temperature.

The library housing 214 is configured to retain various components of the media library 210. For example, as shown in FIG. 2A, the plurality of storage slots 218, the media retriever 224, the one or more media drives 226, the power supply 228, and the controller 230 can all be received and retained at least substantially, if not entirely, within the library interior 216 that is defined by the library housing 214. Additionally, as illustrated in FIG. 2A, the library housing 214 can be rigid and can have a substantially rectangular-shaped cross-section. Alternatively, the library housing 214 can have another suitable shape or configuration. For example, the library housing 214 can have a substantially square-shaped or any other suitable shaped cross-section.

The library housing can have an exhaust vent 245 positioned on the second wall 250. The hot air from the library interior 216 can be moved through the exhaust vent 245 into the hot aisle 260. The air mover assembly 246 can be positioned at least partially over the exhaust vent 245.

In the embodiment shown in FIG. 2A, the storage slots 218 can be positioned within the library housing 214, with the storage slots 218 being configured to receive and retain (and store) the storage media 220. More particularly, in various embodiments, each of the storage slots 218 is configured to receive and retain a single storage medium 220. In some embodiments, the storage slots 218 and the storage media 220 are positioned between the heat-producing devices and the second wall 250. In various embodiments, the media library 210 can include any suitable number of storage slots 218, and/or the media library 210 can be designed to retain any suitable number of storage media 220. Alternatively, the storage slots 218 can be arranged in a different manner than is illustrated and described relative to FIG. 2A.

The media retriever 224 selectively, e.g., upon request of a user, retrieves and moves the storage media 220 as desired between the storage slots 218 and the media drives 226. In particular, during use, upon receiving a signal from the controller 230 to access a certain storage medium 220, the media retriever 224 can be manipulated to physically retrieve the requested storage medium 220 from its associated storage slot 218 in the media library 210. Subsequently, the media retriever 224 moves the storage medium 220 to an appropriate media drive 226, and inserts the storage medium 20 into a media drive 226 so that the requested read/write or monitoring operations can be performed. Upon completion of the requested read/write or monitoring operations, the media retriever 224 can then return the storage medium 220 to an appropriate storage slot 218 or other suitable location.

Additionally, it is appreciated that although a single media retriever 224 is illustrated in FIG. 2A, the media library 210 can be designed to include more than one media retriever 224. For example, in one non-exclusive alternative embodiment, the media library 210 can include two media retrievers 224 to function in different portions of the media library 210 and/or to provide redundancy in the event that one of the media retrievers 224 fails.

The one or more media drives 226 are configured for reading and/or writing data with respect to the storage media 220. The number of media drives 226 provided within the media library 210 can be varied to suit the specific requirements of the media library 210. For example, in certain embodiments, the media library 210 can include seven media drives 226 that are stacked substantially one on top of another (with limited spacing there between). Alternatively, the media library 210 can include greater than seven or fewer than seven media drives 226 and/or the media drives 226 can be positioned in a different manner relative to one another.

The power supply 228 provides electrical power in a well-known manner to the one or more media drives 226, the media retriever 224, the controller 230, and/or additional media libraries 210. The power supply 228 can be interfaced with these components as well as with an external power source in a well-known manner using industry standard cabling and connections. Alternatively, the power supply 228 can be interfaced with these components in another manner. The power supply 228 can also power other components of the media library 210. In some embodiments, the power supply 228 can have an internal fan (not shown) that removes waste heat. In various embodiments, the media library 210 can have multiple power supplies 228.

The controller 230 provides the desired and necessary control for general functionality of the media library 210. The controller 230 can have any suitable design, many of which are well-known in the industry. For example, in one embodiment, the controller 230 can include a standard driver interface unit for receiving digital commands and translating the commands into driving currents, such as step pulses for controlling stepper motors. As another non-limiting example, the controller 230 can include an interface for receiving temperatures or other environmental data associated with the media library 210. Further, the controller 230 can include a standard programmable general purpose controller formed on a single plug-in card unit and can include a programmed microprocessor or microcontroller, memory, communication interface, control interface, connectors, etc. Alternatively, the controller 230 can have a different design and/or the controller 230 can be positioned within the media library 210 in a different position or manner than that illustrated in FIG. 2A.

The air mover assembly 246 can include a first air mover 246F that is coupled to the library housing 214. In some embodiments, the first air mover 246F is configured to move air into the library interior 216 through the first wall 248 and out of the library interior 216 through the second wall 250. In certain embodiments, the air mover assembly 246 is coupled to the library housing 214. In further embodiments, the air mover assembly 246 is coupled to the second wall 250 of the library housing. The air mover assembly 246 can have any suitable design, many of which are well known in the industry. In some alternative embodiments, the air mover assembly 246 can be positioned on and/or coupled to the first wall 248. In other embodiments, the air mover assembly 246 can be positioned on and/or coupled to any surface of the library housing 214. In various embodiments, the air mover assembly 246 can be positioned at least partially over the exhaust vent 245.

In some embodiments, the air mover assembly 246 can further include a second air mover 246S. The second air mover 246S can be coupled to the the second wall 250 of the library housing 214, or the second air mover 246S can be coupled to any other suitable surface of the library housing 214. The second air mover 246S can be configured to cooperate with the first air mover 246F to move air through the library housing 214. In certain embodiments, the second air mover 246S is spaced apart from the first air mover 246F.

The air mover assembly 246 assists in moving the air through the media library 210. The air mover assembly 246 can also create the air movement through the media library 210. The number of air mover assemblies 246 can vary from a single air mover assembly 246 to multiple air mover assemblies 246 depending on the needs of the media library 210. In some embodiments, the air mover assembly 246 can adjust, i.e. increase or decrease, the movement of air through the library housing 214. In certain embodiments, the air mover assembly 246 can be controlled by the controller 230.

As shown in FIG. 2A, the air mover assembly 246 moves or pulls the inlet air flow 234 from the cold aisle 258 into the heat-producing devices where it removes the waste heat generated by the heat-producing devices. The air then moves out of the heat-producing devices and into the library interior 216 as the interior air flow 252. The interior air flow 252 then moves across the storage slots 218, the storage media 220, and the media retriever 224. Lastly, the interior air flow 252 moves out through the second wall 250 by way of the air mover assembly 246 into the hot aisle 260 as an exhaust air flow 238. Since the interior air flow 252 first passed through the heat-producing devices after entering the library interior 216, the heat from the heat-producing devices is added to the inlet air flow 234 before reaching the storage slots 218 and storage media 220. The air mover assembly 246 ensures the temperature rise of the air as it flows through the heat-producing devices is minimized, thereby ensuring the temperature of the storage media 220 stays below the maximum allowed temperature.

In some embodiments, the controller 230 is configured to utilize data from multiple sources to determine a desired amount of air movement through the library interior 216. As a non-limiting example, the controller 230 can receive data from the air mover assembly 246 itself, such as current revolutions per minute or motor temperature. As another non-limiting example, the controller 230 can receive data from the media drives 226 representing the current workload of the media drive 226 that allows the controller 230 to predict an increase in the temperature of the interior air flow 252 due to the additional heat added to the inlet air flow 234 by the media drives 226. The controller 230 can increase the movement of air through the library interior 216 in response to an increase in workload to minimize or eliminate a temperature rise of the storage media 220.

In some embodiments, the interior temperature sensor 254 is in communication with the controller 230. The controller 230 can adjust the air mover assembly 246 based in part on the temperature reported by the interior temperature sensor 254. For example, if the temperature reported by the interior temperature sensor 254 indicates an increase in the internal temperature, the controller 230 can adjust the air mover assembly 246 so that the interior air flow 252 increases.

In various embodiments, an inlet temperature sensor 256 is positioned near the first wall 248. In some embodiments, the inlet temperature sensor 256 is in communication with the controller 230. The inlet temperature sensor 256 is configured to sense the temperature of the inlet air flow 234 or the exterior of the media library such as, for example, the cold aisle 258, which is then communicated to the controller 230 for use in determining a desired amount of interior air flow 252 through the library housing 214.

In some embodiments, the inlet temperature sensor 256 and the interior temperature sensor 254 can have additional functions. For example, in some embodiments, the inlet temperature sensor 256 and/or the interior temperature sensor 254 can be configured to capture humidity data. In some embodiments, the inlet temperature sensor 256 and/or the interior temperature sensor 254 can be configured to capture barometric pressure. It is appreciated that multiple sensors can be deployed in the media library 210.

Figure 2B:
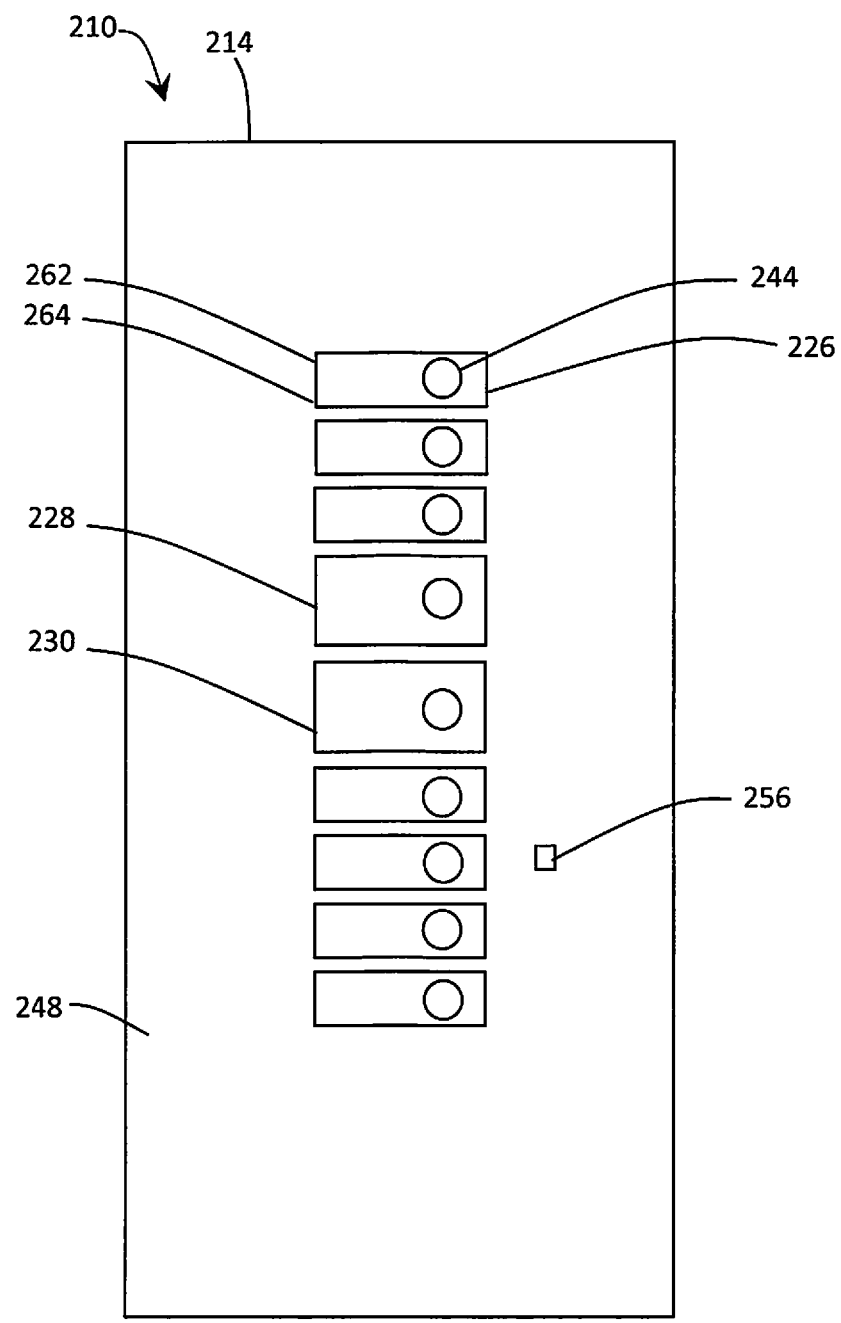
FIG. 2B is a simplified front view illustration of media library in FIG. 2A showing devices penetrating through front of the media library.

FIG. 2B is a simplified front view illustration of the media library 210 showing the first wall 248 of the media library 210. The first wall 248 can include an opening 262. The shape and size of the opening 262 can vary. It is appreciated that the first wall 248 can have more than one opening 262. In some embodiments, the first wall 248 can have an opening 262 for each heat-producing device positioned in the library interior 216. In certain embodiments, a media drive 226 can fit into the opening 262 where the media drive 226 can form a seal 264 with the first wall 248. In some embodiments, the seal 264 can be airtight. The media library 210 can also have an air intake 244 to allow for air movement into the library interior 216.

An inlet temperature sensor 256 can be positioned on the first wall 248 (or any other wall) where it can sense the temperature of the inlet air flow 234 (see FIG. 2A) through the air intake 244 (or at another suitable location). The location of the inlet temperature sensor 256 can vary.

Figure 3:
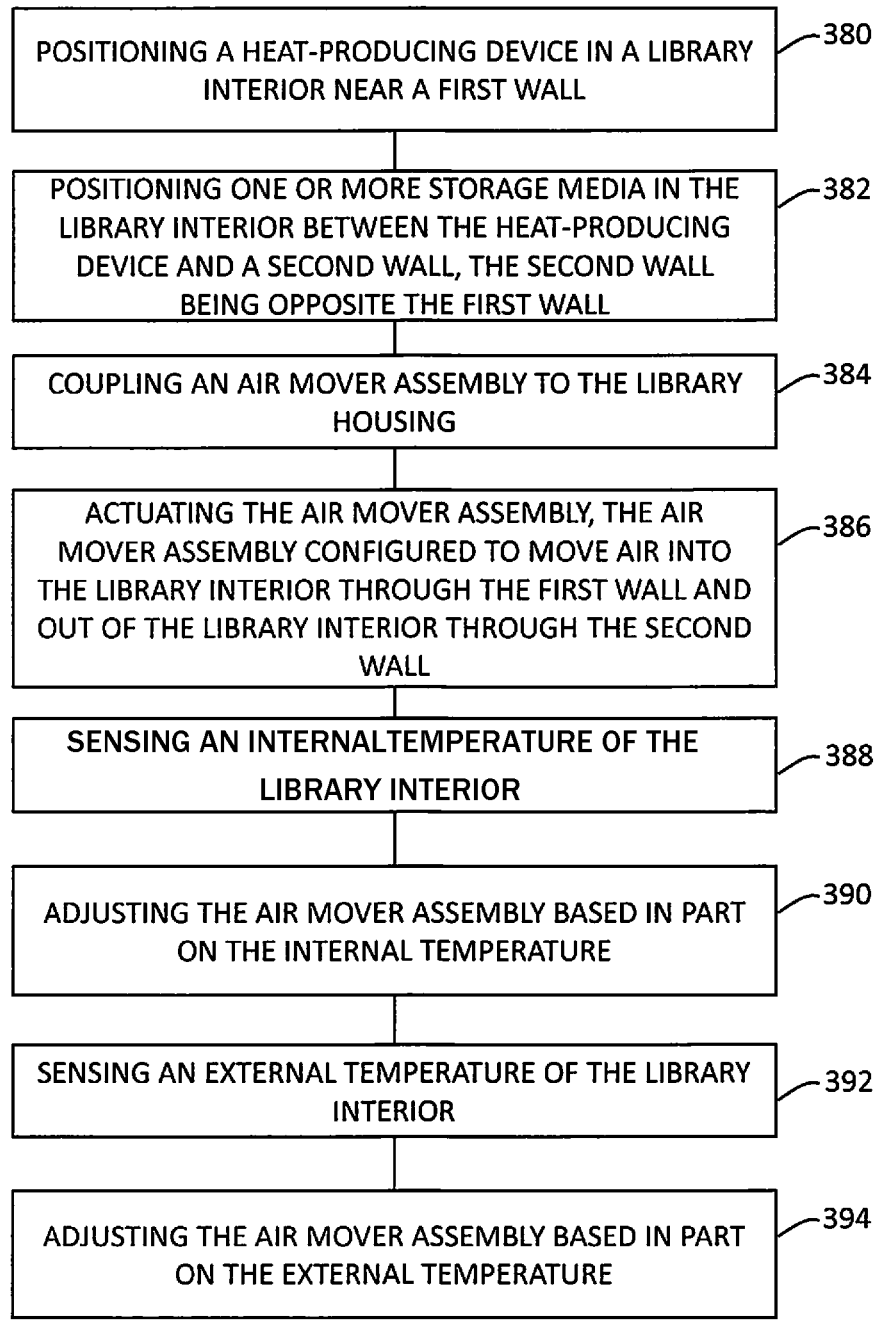
FIG. 3 is a flowchart illustrating one embodiment of a method for controlling the internal temperature of a media library.

FIG. 3 is a flow chart illustrating a method for controlling the internal temperature of a media library. It is understood that the various steps described herein can be modified as necessary in the process for controlling the internal temperature of a media library. Additionally, is should be appreciated that in certain applications the order of the steps can be modified, certain steps can be omitted, and/or additional steps can be added without limiting the intended scope and breadth of the present invention.

At step 380, a heat-producing device is positioned in a library interior near a first wall. In some embodiments, the heat-producing device can be one of a media drive, a power supply, and a controller. The heat-producing device can be any component or sub-system used in the operation of a media library that produces heat.

At step 382, one or more storage media are positioned in the library interior between the heat-producing device and a second wall, where the second wall is opposite the first wall. The storage media can be a tape media. The storage media can have a maximum allowable temperature above which the storage media is subject to damage or reduced performance.

At step 384, an air mover assembly is coupled to the library housing. The air mover assembly can be positioned anywhere on the second wall. The air mover assembly can adjust the air flow through the library housing. The media library can have the air mover assembly positioned on any wall.

At step 386, the air mover assembly is actuated. The air mover assembly can be configured to move air into the library interior through the first wall and out of the library interior through the second wall. The air mover can move air from a cold aisle, through the heat-producing device, across the storage media, and out of the media library through the second wall.

At step 388, an internal temperature of the media library is sensed. In some embodiments, the internal temperature is communicated to a controller. In some embodiments, humidity and/or barometric pressure can be communicated to the controller. In other embodiments, more than one temperature of the library interior and/or exterior can be sensed and communicated to the controller.

At step 390, the air mover assembly is adjusted based in part on the internal temperature of the media library. The air mover assembly can increase the air movement through the library housing in response to the internal temperature. The air mover assembly can also decrease the air movement through the library housing in response to the internal temperature. The air movement can be increased if the sensed internal temperature of the media library is approaching or above the maximum allowable temperature for the storage media. Alternatively, the air movement can be decreased if the sensed temperature of the media library is below the maximum allowable temperature.

At step 392, an external temperature of the library interior is sensed. The external temperature can be sensed near the first wall.

At step 394, the air mover assembly is adjusted based in part on the external temperature of the media library. The air mover assembly can increase the air movement through the library housing based on the external temperature. The air mover assembly can also decrease the air movement through the library housing based on the external temperature. The air movement can be increased if the sensed external temperature of the media library increases from a previous reading. Alternatively, the air movement can be decreased if the external temperature decreased from a previous reading.

It is understood that although a number of different embodiments of the system and method for controlling the internal temperature of a media library have been illustrated and described herein, one or more features of any one embodiment can be combined with one or more features of one or more of the other embodiments, provided that such combination satisfies the intent of the present invention.

While a number of exemplary aspects and embodiments of the system and method for controlling the internal temperature of a media library have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A media library comprising:
 a library housing that defines a library interior, the library housing having a first wall and a second wall positioned opposite the first wall;
 one or more storage media positioned in the library interior;
 a heat-producing device positioned near the first wall of the library housing, the heat-producing device including a media drive that is configured for at least one of reading data from the one or more storage media and writing data to the one or more storage media;
 one or more storage slots that are positioned within the library interior, each of the one or more storage slots being configured to passively retain and store at least one of the one or more storage media so that no heat-producing operation occurs therein, the one or more storage slots with the storage media retained therein being positioned between the media drive and the second wall;
 a media retriever that is configured to move the one or more storage media within the library interior between the one or more storage slots and the media drive;
 an air intake positioned on the first wall;
 an exhaust vent positioned on the second wall; and
 an air mover assembly that is coupled to the library housing, the air mover assembly being configured to move air into the library interior through the first wall, and then moving the air through the media drive, before subsequently moving the air across the one or more storage slots, and then moving the air out of the library interior through the second wall;

wherein the air mover assembly moves air into the library interior via the air intake, and moves air out of the library interior via the exhaust vent.

2. The media library of claim 1, wherein the air mover assembly includes a first air mover that is configured to move the air into the library interior through the first wall.

3. The media library of claim 2, wherein the first air mover moves air out of the library interior through the second wall.

4. The media library of claim 2, wherein the air mover assembly further includes a second air mover that cooperates with the first air mover to move air through the library interior.

5. The media library of claim 4, wherein the second air mover is spaced apart from the first air mover.

6. The media library of claim 1, wherein the media drive is positioned substantially between the first wall and the one or more storage slots.

7. The media library of claim 1, further comprising a controller that is configured to control the air mover assembly to adjust air movement through the library housing.

8. The media library of claim 1, further comprising a controller that is configured to control the air mover assembly to adjust air movement through the library housing based at least in part upon a temperature reading within the library interior.

9. The media library of claim 1, further comprising a controller that is configured to control the air mover assembly to adjust air movement through the library housing based at least in part upon a temperature reading outside of the library interior.

10. The media library of claim 1, further comprising a controller that is configured to control the air mover assembly to adjust air movement through the library housing based at least in part on a signal from the heat-producing device, the signal indicating a workload of the heat-producing device.

11. The media library of claim 1, wherein the one or more storage media have a maximum allowed temperature, and wherein the media library is configured to maintain the one or more storage media below the maximum allowed temperature.

12. The media library of claim 1, wherein the first wall includes an opening; and wherein the heat-producing device is positioned in the opening of the first wall so that the heat-producing device forms a seal with the first wall.

13. The media library of claim 1 further comprising a power supply and a controller; wherein the first wall and the second wall are exterior walls of the library housing that define at least a portion of the library interior; and wherein the heat-producing device, the one or more storage slots, the media retriever, the power supply and the controller are each received and retained substantially within the library interior.

14. A method of managing an interior temperature of a media library, the method comprising the steps of:
   positioning one or more storage media in a library interior as defined by a library housing of the media library, the library housing having a first wall and a second wall positioned opposite the first wall;
   positioning a heat-producing device in the library interior near the first wall of the library housing, the heat-producing device including a media drive that is configured for at least one of reading data from the one or more storage media and writing data to the one or more storage media;
   positioning one or more storage slots within the library interior, each of the one or more storage slots being configured to passively retain and store at least one of the one or more storage media so that no heat-producing operation occurs therein, the one or more storage slots with the storage media retained therein being positioned between the media drive and the second wall;
   moving the one or more storage media within the library interior between the one or more storage slots and the media drive with a media retriever; and
   actuating an air mover assembly that is configured to move air into the library interior through the first wall, and then moving the air through the media drive, before subsequently moving the air across the one or more storage slots, and then moving the air out of the library interior through the second wall;
   wherein the step of actuating includes the air mover assembly moving air into the library interior via an air intake positioned on the first wall, and moving air out of the library via an exhaust vent positioned on the second wall.

15. The method of claim 14, further comprising the steps of: (i) sensing an internal temperature of the library interior; and (ii) adjusting the air mover assembly based in part on the internal temperature.

16. The method of claim 14, further comprising the steps of: (i) sensing an external temperature outside of the media library; and (ii) adjusting the air mover assembly based in part on the external temperature.

17. The method of claim 14, wherein the step of positioning the heat-producing device includes positioning the media drive substantially between the first wall and the one or more storage slots.

18. The method of claim 14, wherein the air mover assembly includes a first air mover and a second air mover that cooperate to move air first across the media drive and then across the one or more storage slots.

19. The method of claim 14, wherein the step of positioning the one or more storage media includes the first wall having an opening; and wherein the step of positioning the heat-producing device includes positioning the heat-producing device into the opening of the first wall so that the heat-producing device forms a seal with the first wall.

20. The method of claim 14 wherein the step of positioning the one or more storage media includes the first wall and the second wall being exterior walls of the library housing that define at least a portion of the library interior; and further comprising the step of receiving and retaining each of the heat-producing device, the one or more storage slots, the media retriever, a power supply and a controller substantially within the library interior.

* * * * *